United States Patent [19]
Payton

[11] Patent Number: 5,285,380
[45] Date of Patent: Feb. 8, 1994

[54] SYSTEM AND METHOD FOR PROCESSING COMMANDS FROM A PLURALITY OF CONTROL SOURCES

[75] Inventor: David W. Payton, Woodland Hills, Calif.

[73] Assignee: Hughes Aircraft Company, Los Angeles, Calif.

[21] Appl. No.: 741,880

[22] Filed: Aug. 7, 1991

[51] Int. Cl.$^5$ .............................................. G06F 9/44
[52] U.S. Cl. ................................... 364/174; 364/461; 395/900; 395/905
[58] Field of Search .................. 395/51, 61, 900, 903, 395/905, 90, 81, 93; 364/174, 175, 461

[56] References Cited

U.S. PATENT DOCUMENTS

| | | | |
|---|---|---|---|
| 4,616,326 | 10/1986 | Meier et al. | 395/93 |
| 5,122,957 | 6/1992 | Hattori | 395/900 |
| 5,148,089 | 9/1992 | Adachi et al. | 395/900 |

OTHER PUBLICATIONS

Arkin, R., "Motor Schema Based Navigation for a Mobile Robot: An Approach to Programming by Behavior," In IEEE Conf. on Robotics and Automation, Mar., 1987 pp. 264–271.
Brooks, R. A., "A layered Intelligent Control System for a Mobile Robot," in ISSI Third International Symposium of Robotics Research, Gouvieux, France, Oct. 1985.
Lee, C. C., "Fuzzy Logic in Control Systems: Fuzzy Logic Controller–Part I, IEEE Systems, Man, and Cybernetics", 20(2), 1990, pp. 404–418.
Lee, C. C. "Fuzzy Logic in Control Systems: Fuzzy Logic Controller, Part II, IEEE Systems, Man, and Cybernetics", 20(2), 1990, pp. 419–435.
Payton, D. W., "An Architecture for Reflexive Autonomous Vehicle Control," in IEEE International Conference on Robotics and Automation, San Francisco, Calif. Apr. 7–10, 1986, pp. 1838–1845.
Rosenblatt, J. K. and Payton D. W., "A Fine-grained Alternative to the Subsumption Architecture for Mobile Robot Control," in International Joint Conference on Neural Networks, Washington, D.C., Jun. 1989, pp. 317–324.

*Primary Examiner*—Allen R. MacDonald
*Attorney, Agent, or Firm*—V. D. Duraiswamy; W. K. Denson-Low

[57] ABSTRACT

A system for obtaining collective decisions from multiple control sources. The system is able to produce a single command from these control sources. Each control source corresponds to a behavior and each responds to inputs to produce a command. The system employs a piece-wise constant preference profile composed of zones, spikes, and clamps which compress the amount of the amount of data required to process behavior preferences. The system sorts commands according to command values in a chart to produce a total profile which represents the combination of profiles of the command values for multiple behaviors. The peak zone in the total profile is then used to produce a desired response to the multiple commands. The system allows behaviors to be combined through command fusion rather than subsumption. The piece-wise constant representation allows behavior commands to be combined after they have been passed through a standard control system. This permits behaviors to use any derivative of the control source's variable that is appropriate for their function. The system has a bounded arbitration time so that control loop stability will not be disrupted by the arbitration process. The system also incorporates a method for smoothing behavior switching transients.

28 Claims, 12 Drawing Sheets

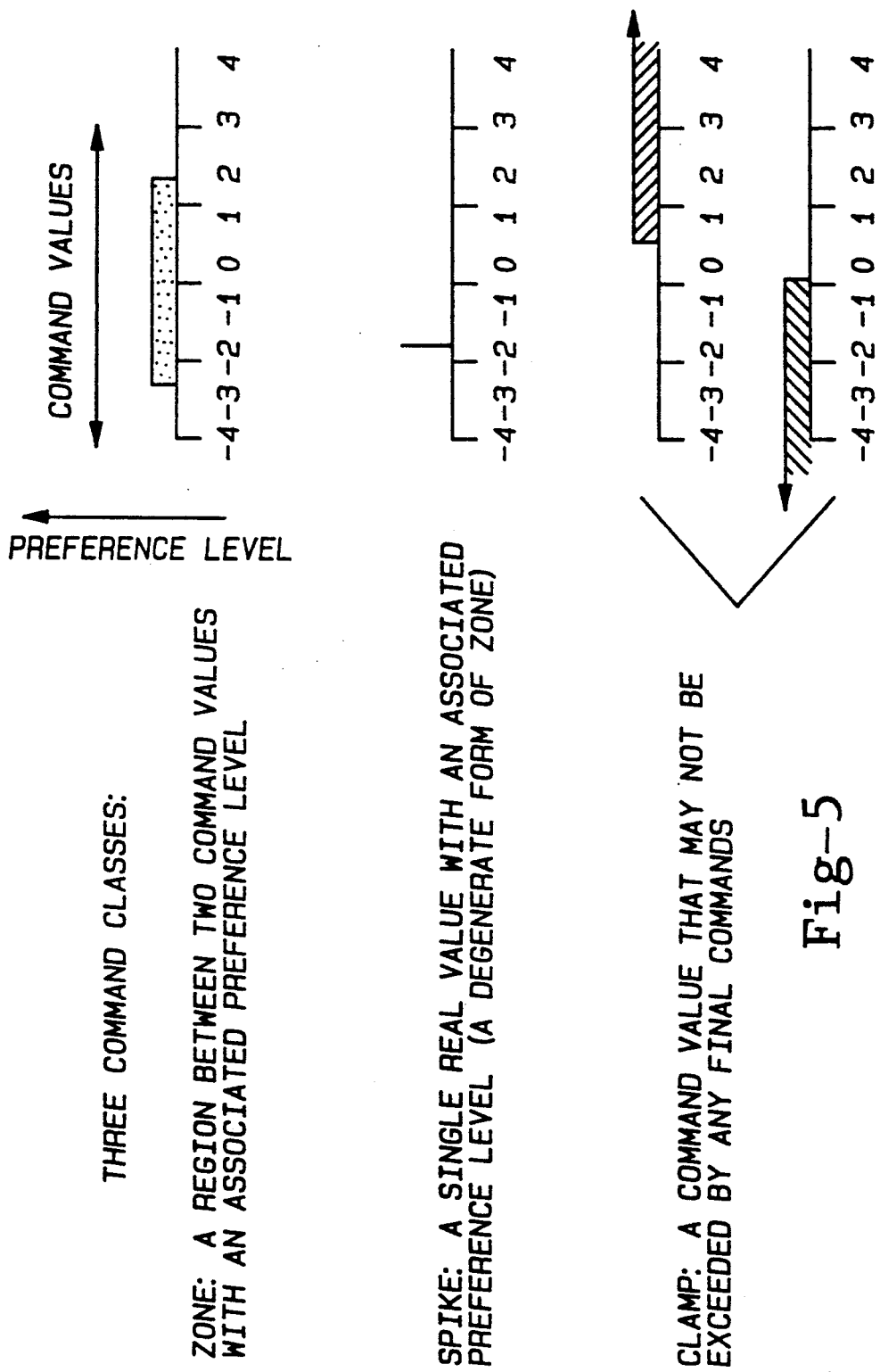

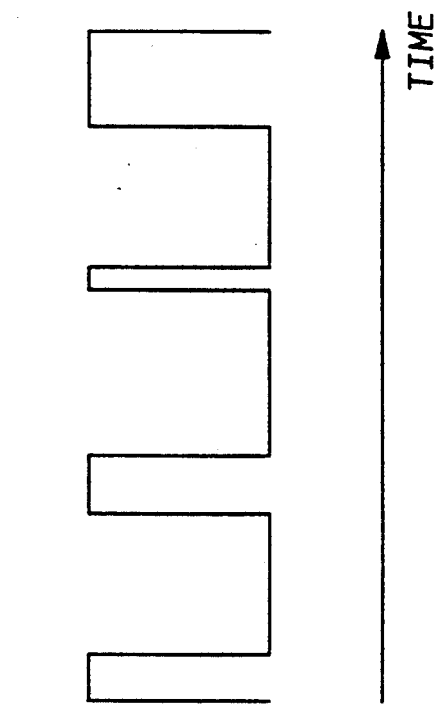
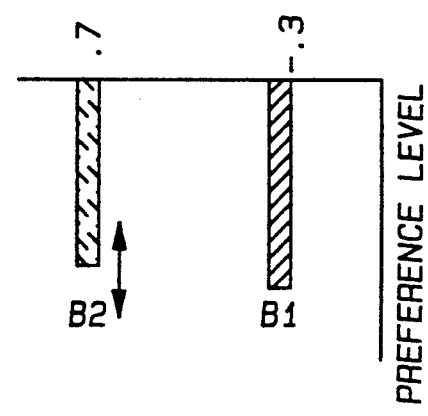
OUTPUT COMMANDS
Fig-11
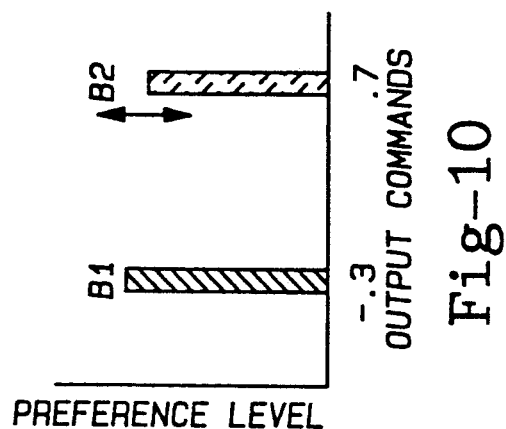
Fig-10

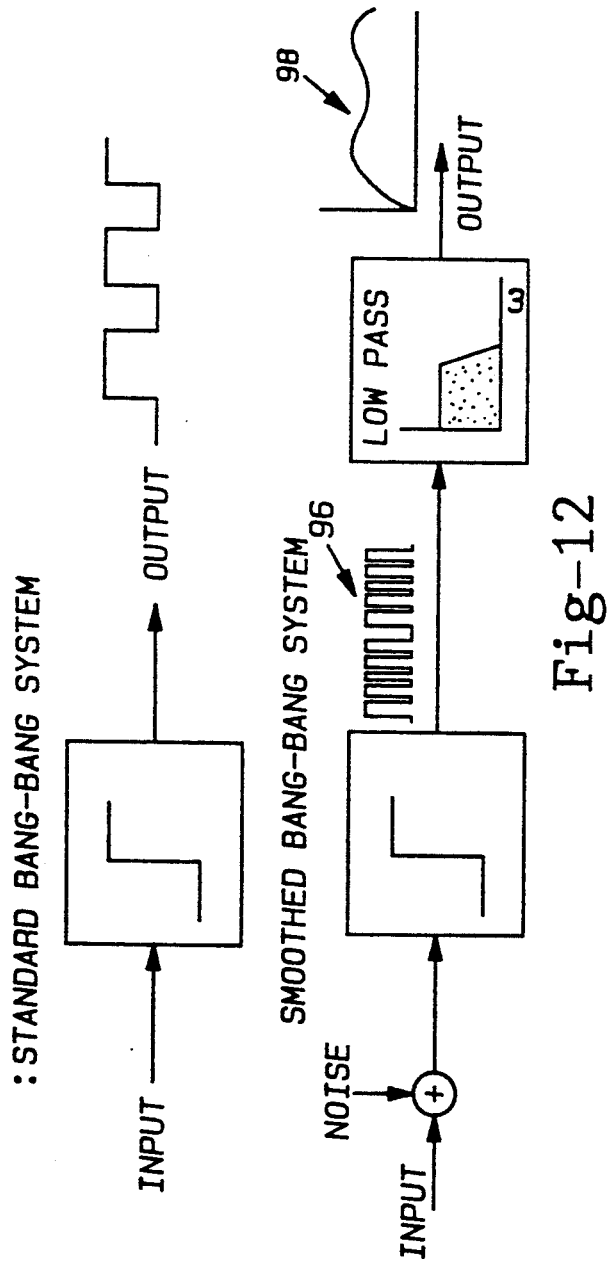
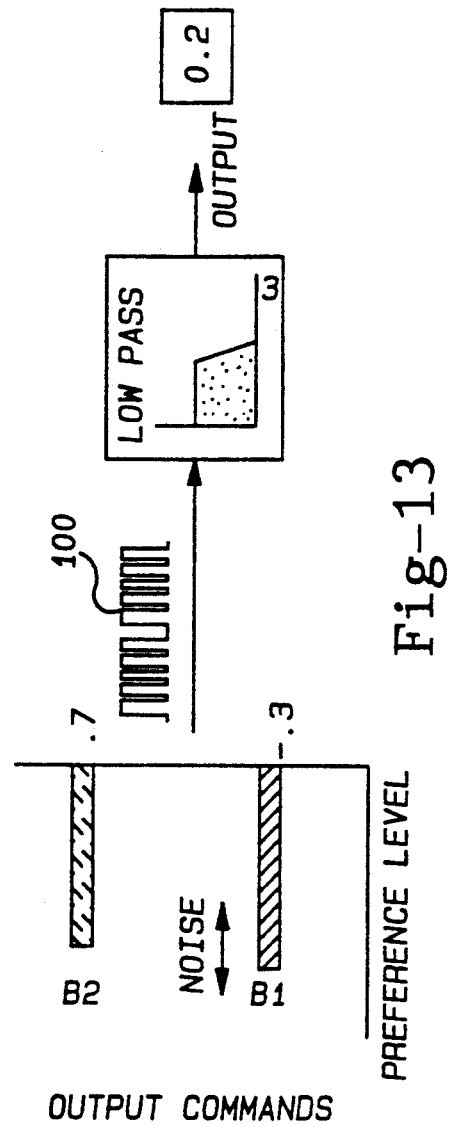
Fig-12
Fig-13

SYSTEM AND METHOD FOR PROCESSING COMMANDS FROM A PLURALITY OF CONTROL SOURCES

This invention was made with Government support under N61331-90-C-0040 awarded by the Department of the Navy. The government has certain rights in this invention.

BACKGROUND OF THE INVENTION

1. Technical Field

This invention relates to control systems, and more particularly to systems for representing and combining multiple concurrent control commands to produce coherent action.

2. Discussion

Sensor based intelligent real-time control systems are used in a variety of applications. These include autonomous, air, land, and underwater vehicles. Also such control systems are found in sensor steering, missile guidance, vehicle actuator control systems and process control systems. The central task of such control systems is to combine a variety of sensory inputs to obtain a reasonable control decision.

There is an emerging class of control systems, sometimes called fuzzy controllers, or behavior-based control systems in which control actions are computed from the collective votes of many independent control procedures or rules. These procedures or rules are sometimes referred to as behaviors. For example, in a vehicle control system, one behavior may perform obstacle avoidance, and another behavior may perform target tracking. While both behaviors may issue commands for turning the vehicle, these commands may or may not agree. Thus, it is necessary for a control architecture to represent and combine the behavior commands in such a way that a single action may be discerned from the collective preferences of multiple behaviors.

Many techniques have been developed for the purpose of combining commands from multiple, simple, control laws or decision rules. One technique is called the subsumption architecture. See Brooks, R. A., "A Layered Intelligent Control System for a Mobile Robot," in ISSR; *Third International Symposium of Robotics Research*, Gouvieux, France, October, 1985.

In the subsumption architecture, simple finite-state machines can inhibit or subsume the output of others. This provides a means to incrementally assemble a complex real-time control system from many simple behaviors. However, the combination scheme used in subsumption does not allow behaviors to express preferences and does not provide a means to combine alternative concerns from different behaviors.

Later work in behavior-based control allowed behaviors to place commands in an array, and other behaviors could alter these commands if they had suitable priority. See Payton, D. W., "An Architecture for Reflexive Autonomous Vehicle Control," in *IEEE International Conference on Robotics and Automation*, San Francisco, Calif., April 7-10, 1986, pp. 1838-1845. In this system, each command could be assigned a unique function that would define how new commands would be combined with the existing array entry. A behavior could thus overwrite a previous command, yielding the same effect as in subsumption. Alternatively, the array entry could be updated with the average, the maximum, or the minimum of the new command and the current entry value. Still, this technique did not allow for the combination of preferences from behaviors.

Later, a technique was developed that allowed the combination of discrete preferences from behaviors. See Rosenblatt, J. K. and Payton, D. W., "A Fine-grained Alterative to the Subsumption Architecture for Mobile Robot Control," in *International Joint Conference on Neural Networks*, Washington, D.C., June 1989, pp. 317-324.

This technique quantizes steering commands into discrete values. Behaviors vote on their preference for each command choice. By summing up the preferences from all behaviors for each choice, the one choice with maximum preference will prevail. However, the discrete representation of this approach has a fundamental limitation when applied to control systems. All behavior commands must be expressed in terms of the same derivative of the selected control variable. Thus, commands from a behavior that controls heading cannot easily be combined with commands from another behavior that controls turn rate. Both behaviors must be constrained to using the same control derivative in order for their commands to be combined. This can often make the design of individual behaviors awkward and difficult. The discrete representation also imposes limits on the resolution of control commands. If a given set of control command values is available for voting by the behaviors, then command values that lie between those that are given are not easily attained.

Another approach to combination of commands from multiple behaviors is discussed in the article by R. Arkin, "Motor Schema Based Navigation for a Mobile Robot: An Approach to Programming by Behavior," in *IEEE Conf. on Robotics and Automation*, March, 1987, pp. 264-271. Unlike the approach used in subsumption, each behavior in Arkin's approach provides a command vector that represents a desired heading and velocity. Arkin sums these vectors to yield a final command vector that presumably will satisfy the needs of the contributing behaviors. However, the result of summing vectors is entirely different from the result of finding the maximum preference. If a vector to go left is summed with a vector to go right, the result will be a vector to go straight ahead. This could end up conflicting with the desires of both behaviors.

Another area of related research is that of fuzzy logic as applied to control systems. See Lee, C. C., "Fuzzy Logic in Control Systems: Fuzzy Logic Controller-Part I," IEEE Systems, Man and Cybernetics, 20(2), 1990, pp. 404-418; and Lee, C. C., "Fuzzy Logic in Control Systems: Fuzzy Logic Controller, Part II," IEEE Systems, Man, and Cybernetics 20(2), 1990, pp. 419-435. In fuzzy controllers, commands are represented in terms of a range of preferences for a set of discrete command values. Special combination rules are used to combine the preferences from different control rules. Once these preferences have been combined, a process called "defuzzification" is employed. This process extracts a single command from the range of command preferences. Several defuzzification methods exist. The most common method is the "center of area" method. This method generates a command at the center of gravity of the preference distribution. This method can generate commands that are between the discrete preference values, but it has the disadvantage of possibly generating commands that lie at the lowest point of a preference distribution if that point is between two peaks of a bi-modal distribution.

Another method known as the "max criterion" method selects the command with the highest overall preference. This entire process is performed upon a set of discrete command choices. The use of discrete choices resembles the use of discrete preferences in the methods described above in the Payton et al. and Rosenblatt et al. articles discussed above. However, fuzzy controllers do not allow both positive and negative preferences to be expressed by behaviors. This is important because negative preferences allows the establishment of disjoint control options. For example, a vehicle may be commanded to go either left or right, while that it may not go straight ahead. Also, fuzzy logic does not permit the combination of behavior commands that have been expressed in terms of different derivatives of a given control variable.

Accordingly, it would be desirable to provide a system for combining commands from multiple simple control laws or decision rules which allows behaviors to express preferences, and also allows the combination of concerns from different behaviors. It would also be desirable to provide a technique for allowing a combination of preferences from behaviors. It would further be desirable to provide a system which is not constrained to using the same control derivative in order for commands to be combined, but instead which permits the combination of behavior commands that have been expressed in terms of different derivatives of a given control variable. Further, it would be desirable to provide such a system in which, if a preference to go left is summed with the preference to go right, the dominant preference will still be either to go left of right and not to go straight ahead. Also, it would be desirable to provide a control system having the above characteristics which allows both positive and negative preferences to be expressed by behaviors.

SUMMARY OF THE INVENTION

Pursuant to the present invention, a system for obtaining collective decisions from multiple control sources is disclosed. The system receives multiple commands from a plurality of control sources. Each control source corresponds to a behavior which specifies responses to inputs to produce a command output. The system generates zones of command values and command preference levels. The commands are then sorted according to the command values. The system then creates a total profile from the profile of the preference level versus command values of a plurality of control sources by adding the preference level profiles for each control source. The system then determines a peak zone in the total profile having the largest preference level. The system then produces a desired response to the commands indicated by the peak zone. As a result, command preferences are expressed in terms of a piecewise continuous preference profile and commands need not be specified in terms of predetermined discrete values. The system is easily integrated within standard control systems, since it allows behavior commands to be combined after they have been processed through a standard control system. This allows behaviors to use any derivative of a control variable that is appropriate for their functions.

BRIEF DESCRIPTION OF THE DRAWINGS

The various advantages of the present invention will become apparent to one skilled in the art by reading the following specification and by reference to the following drawings in which:

FIG. 5 illustrates the three command classes in accordance with the present invention;

FIG. 10 is an illustration of output sensitivity in a control system;

FIG. 11 is a comparison of the oscillation between two behavior commands to bang-bang control;

FIG. 12 illustrates the technique for smoothing a bang-bang system;

FIG. 13 illustrates a technique for smoothing behavior oscillations during arbitration in accordance with the present invention;

DETAILED DESCRIPTION OF THE PREFERRED EMBODIMENT

The techniques of the present invention will be illustrated by means of the non-limiting example of a control system for an autonomous underwater vehicle. It will be appreciated that these techniques may be equally applicable to any sensor-based intelligent real-time control problem, including autonomous, air, land and underwater vehicles as well as other problems such as sensor steering, missile guidance and vehicle actuator control. In general, the present invention is applicable to control problems in which a variety of sensory inputs must be combined in order to obtain a reasonable control decision.

Figure 1:
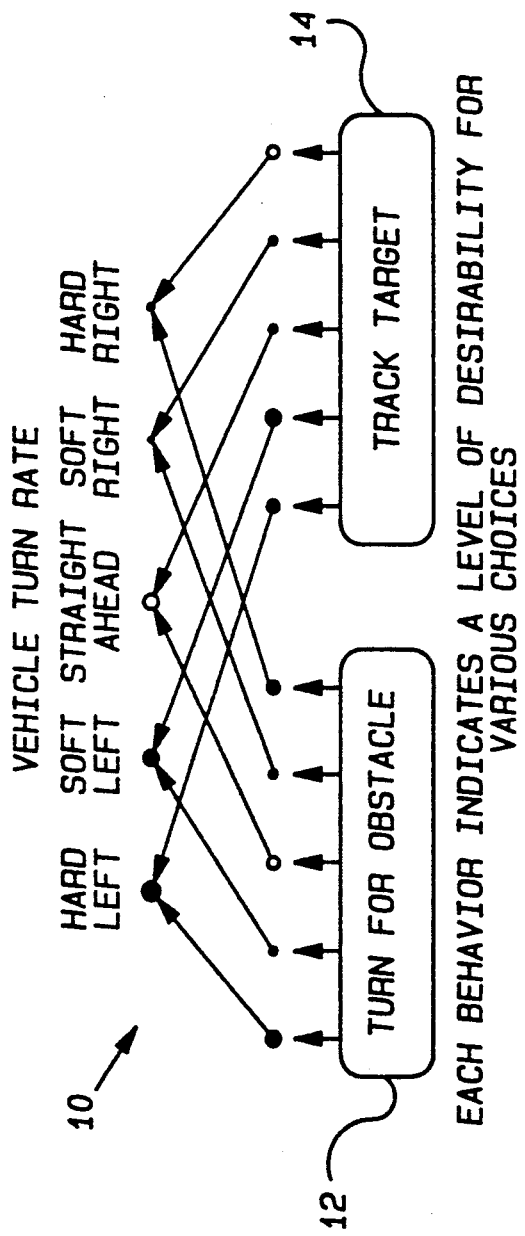
FIG. 1 illustrates a prior art approach to command fusion using a discrete representation of behavior commands.

Referring now to FIG. 1, a prior art approach to command fusion between two behaviors using a discrete representation of behavior commands is illustrated. The system 10 includes two behaviors: an obstacle avoidance behavior which results in commands permitting the vehicle to turn for an obstacle; and a target tracking behavior 14 which issues commands for tracking the target. Thus, it can be seen that rather than issuing a single command, behaviors issue preferences for different command choices.

In the system 10 in FIG. 1, the two behaviors 12 and 14 are issuing preferences for different choices of how much it is desired to turn left, to turn right, or go straight ahead. The solid black dots indicate a preference for a choice, the hollow dots indicate the behavior's opposition to a choice, and the size of each dot is proportional to the strength of that preference or opposition. In this example, an obstacle has been detected directly in front of the vehicle, and the obstacle avoidance behavior indicates that the vehicle should not go straight ahead, but that left or right turns are both acceptable. In order to prevent loss of the target, the target tracking behavior indicates that a left turn is preferred and that a right turn is undesirable. Commands are then combined by summing the strengths of the votes for and against each command option and the choice that gets the highest total preference wins. In this example, a hard left wins, thus, simultaneously satisfying the need to track the target and avoid the obstacle.

Figure 2A:
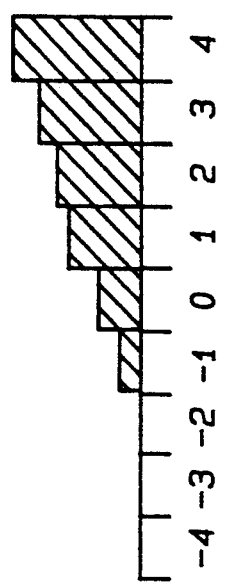
FIG. 2a illustrates a view of how the discrete command fusion process works. A typical command preference profile where each bin represents an integer command value is illustrated.
Figure 2B:
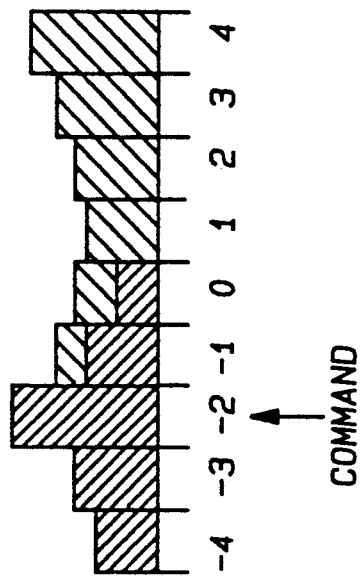
FIG. 2b illustrates another view of how the discrete command fusion process works. A typical command preference profile where each bin represents an integer command value is illustrated.
Figure 2C:
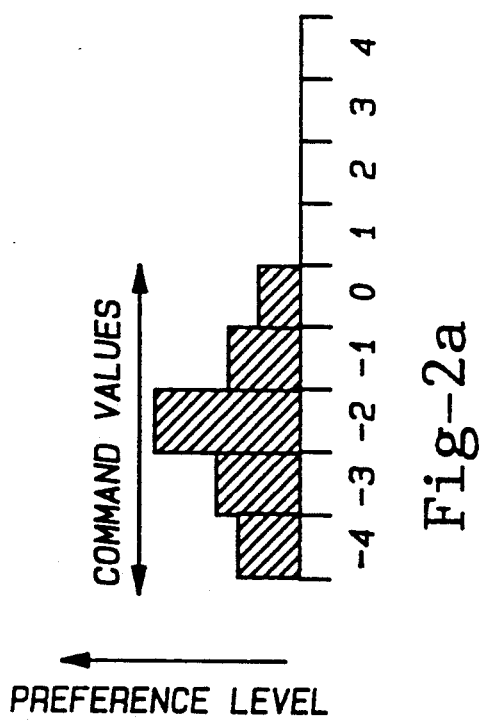
FIG. 2c illustrates a total profile which represents the combination of the profiles of FIGS. 2a and 2b.

Referring now to FIGS. 2a–2c, another view of how discrete command fusion works is illustrated. Essentially, command space is divided up into bins. The preference level within each bin indicates how much preference a behavior has for that choice. If all behaviors have the same number and set of bins, then command fusion is performed by adding the preference levels from corresponding bins and selecting the command with the maximum preference. As an example, FIGS. 2a and 2b show typical command preference profiles where each bin represents an integer command value. FIG. 2c shows the combination of these profiles to yield a total profile. The peak preference may be used to determine the output command which is −2 in this case. The problem with this approach is that a behavior may only choose among a fixed set of discrete command choices, since the choice of bin resolution must be made early in the design process and is not easily changed. Often this choice will have a significant bearing on the overall performance of the system.

Figure 3:
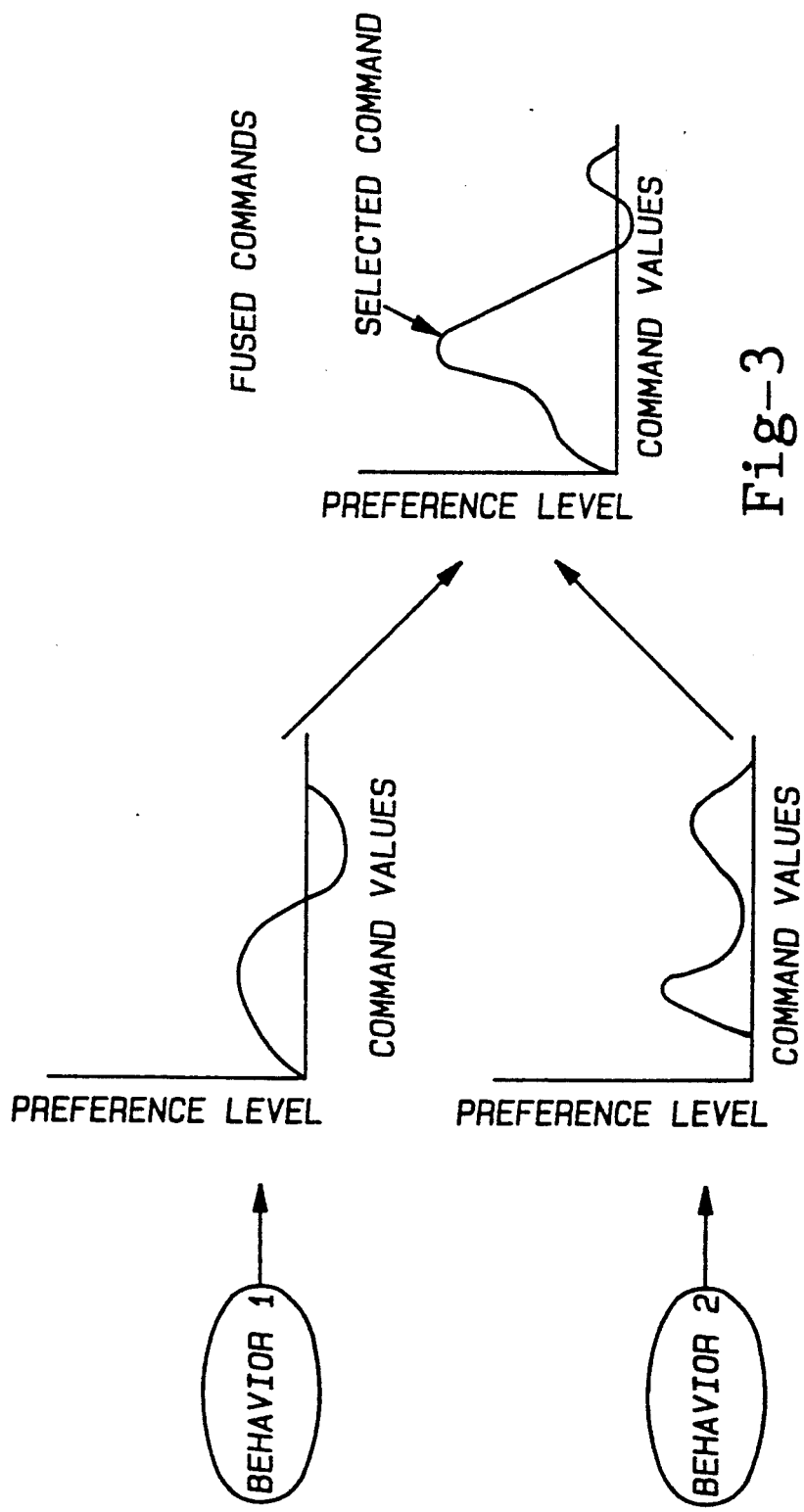
FIG. 3 is a depiction of the expression of behavior command preferences as a continuous function of command values.

Ideally, behavior command preferences could be expressed as a continuous function of command values as shown in FIG. 3. For every value on the real-line, there would be a corresponding preference value. Command fusion could then be performed by adding the continuous functions together and then finding the final command value as a maximum value of the resulting sum. Unfortunately, this representation would require a great deal of computation in order to sum preference functions and obtain the most preferred command. Also, such a representation would be difficult to use with existing control loops.

Figure 4:
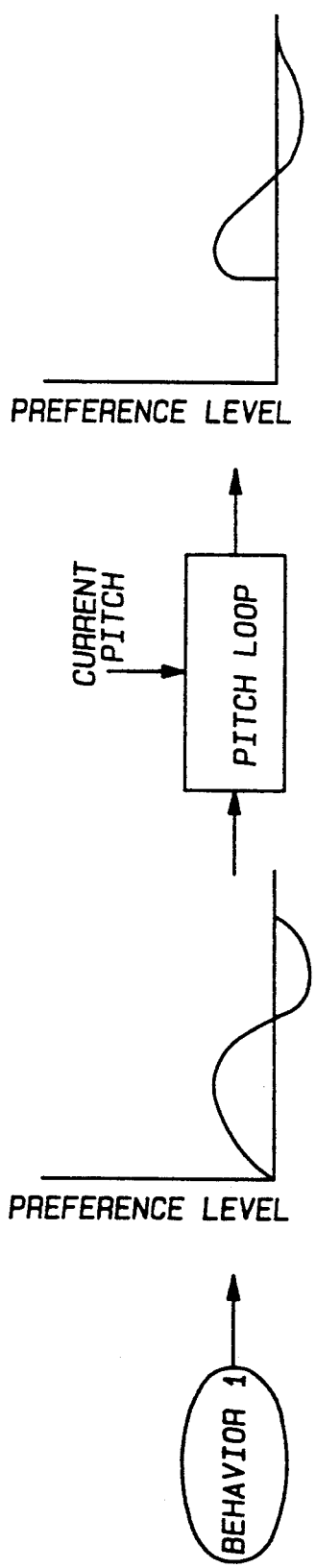
FIG. 4 illustrates some of the difficulties with continuous preference functions in conjunction with standard control systems.

FIG. 4 illustrates one of the difficulties with continuous preference functions. Suppose we wish to fuse commands from behaviors that issue preferences for pitch with other behaviors that issue preferences for pitch rate. This means we must be able to pass behavior command preferences through existing control laws. For example, commands at one level, such as pitch, must be passed through a control loop to obtain the corresponding preferences for pitch rate. Continuous preference functions are not easily transformed if the control laws have any non-linearities.

In accordance with the present invention, a command representation for command preferences is used which overcomes the problems of discrete command choices while still maintaining the necessary computational efficiency to be used within a real-time system. The approach of the present invention is referred to as a piece-wise constant preference profile. It allows behavior commands to be combined after they have been processed through a standard control system. In contrast, discrete command representations are not compatible with standard control systems which expect a single control variable as an input and produce a single control variable as an output. Thus, the present invention allows behaviors to use any derivative of the control variable that is appropriate for their function. For example, one behavior may command pitch and another may command pitch rate.

Referring now to FIG. 5, the piece-wise constant command representation is illustrated as comprising three main command classes: zones; spikes; and clamps. Each behavior may use combinations of zones, spikes, and clamps to represent their preference profile. In more detail:

1. Zone: indicates a constant preference level for any command between the specified upper and lower bounds. Although this is a continuous function, its constant value permits us to represent it simply by the location of its bounds, and it is only these two discrete values that need to be passed through any subsequent control loops. These two bounds are given labels "zone-min" and "zone-max" to keep them distinct from one another. It should be noted that zones may be used to represent preferences, either for or against a range of command values by having positive or negative preference levels.

2 Spike: represents a preference level at one specified value of the control variable. A spike may be viewed as a degenerate zone whose upper and lower bounds are equal.

3. Clamp: places an absolute lower or upper bound on the values that a control variable may assume. After a value has been chosen by the arbiter (as described below), it is compared with the clamp values and may be adjusted to fall within the indicated acceptable range.

Using these three command classes, a behavior can issue a combination of several of these commands to discretely approximate a continuous function, hence the term "piece-wise constant preference profile". This representation is compact because only the edges that bound the commanded preference regions need be retained.

Figure 6:
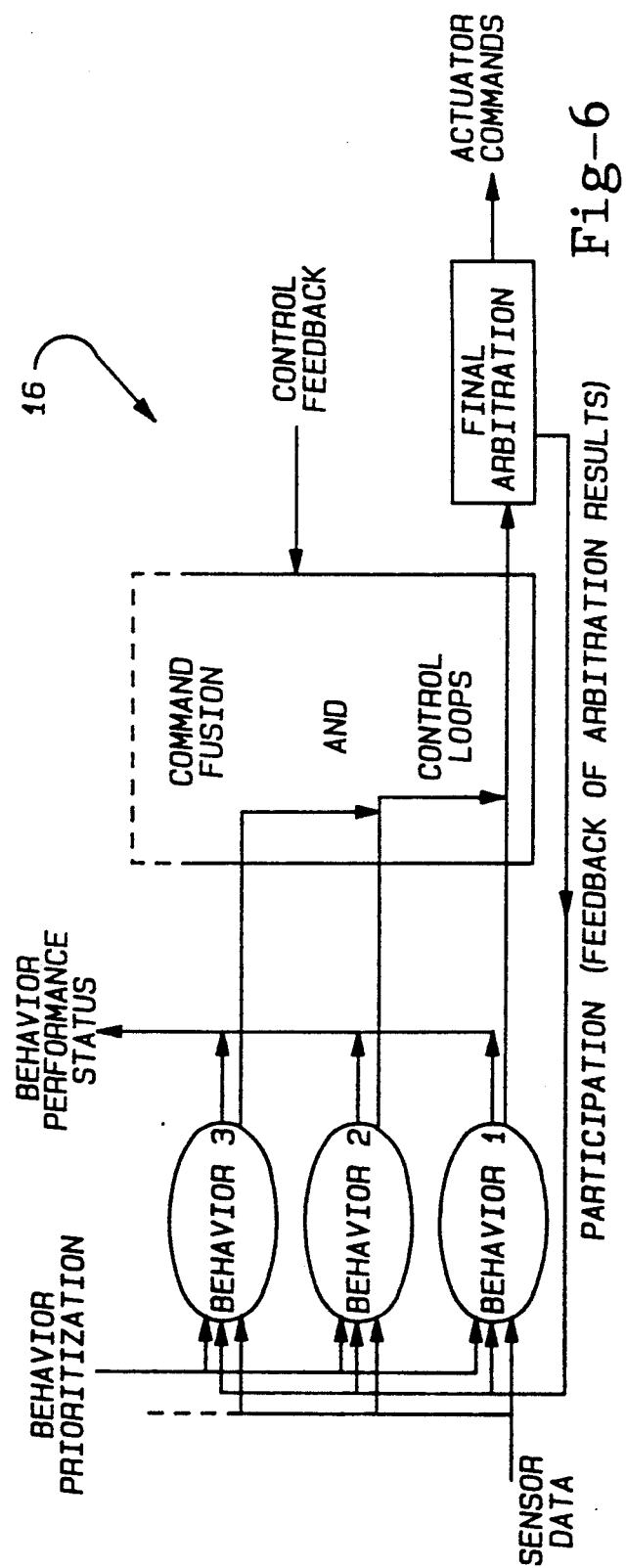
FIG. 6 is a diagram of the overall process of command fusion and arbitration in accordance with the present invention.
Figure 7:
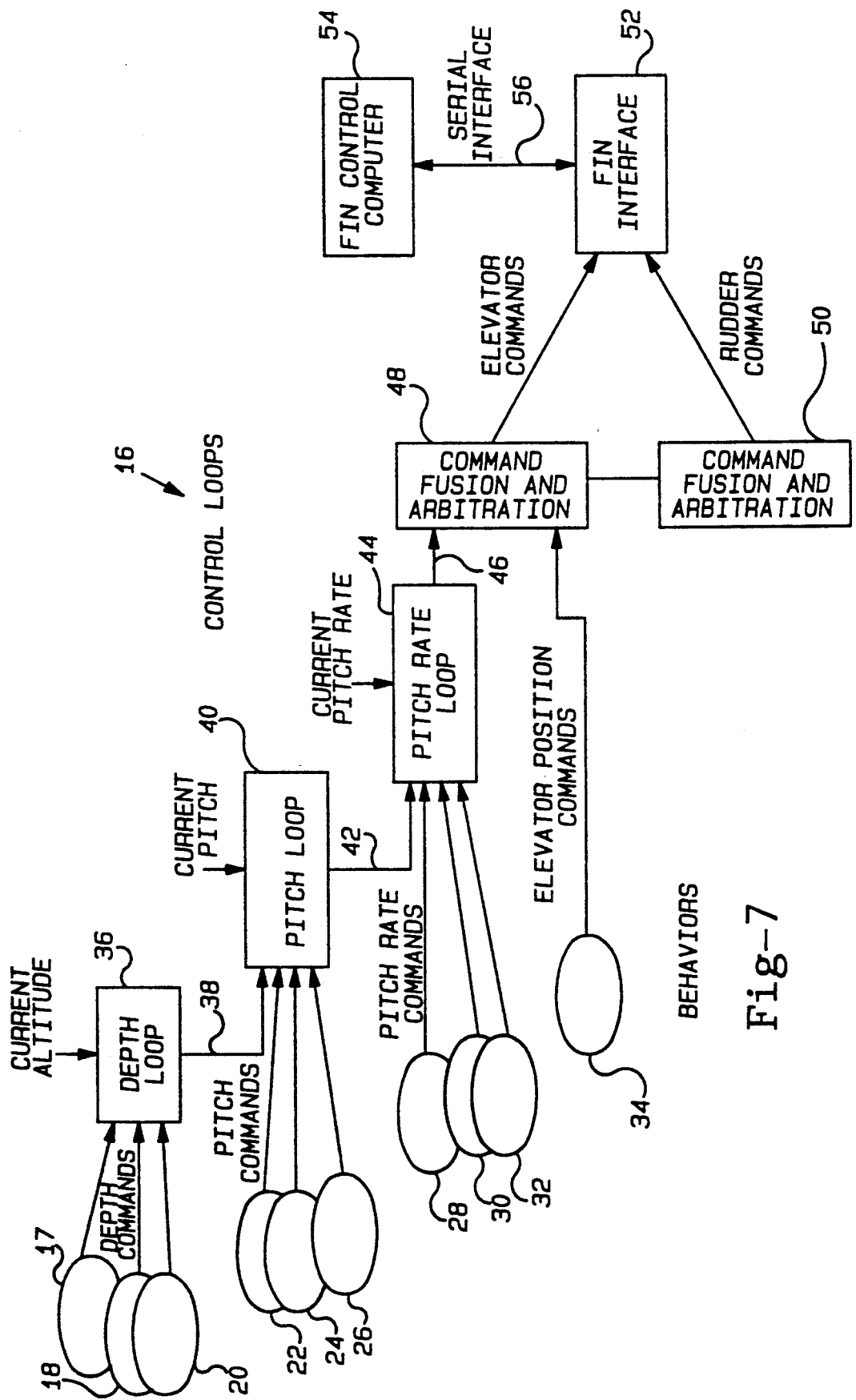
FIG 7 illustrates the ability to incorporate behaviors at many different levels of a standard control system by using the command representations and fusion techniques of the invention.

FIGS. 6 and 7 illustrate an overall system diagrams of the control system 16 in accordance with the present invention. One advantage of the piece-wise constant representation in that it allows behaviors to issue commands at different levels within a control system. It is not meaningful for behaviors to express choices, unless the choices from all behaviors controlling a given actuator can be fused at the same level of abstraction. Pitch commands from one behavior cannot be combined directly with pitch rate commands from another, yet these commands must eventually be merged in order to select a final elevator command. Behavior commands can be passed through vehicle control loops by having control loops process only the edges of zones, spikes, and clamps. Each edge is treated merely as an ordinary control command, except that information regarding preference level, command type, and originating behavior are retained for each edge.

As best illustrated in FIG. 7, it may be more natural for some behaviors to issue depth commands, such as behaviors 17, 18, and 20, while others issue pitch commands, such as behaviors 22, 24, and 26, and others issue pitch rate commands, such as behaviors 28, 30, and 32, and still others issue elevator position commands, such as behavior 34. Thus, depth commands are combined with the current attitude in a depth control loop 36 to arrive at a pitch command along line 38. Pitch commands are combined in the pitch control loop 40 with current pitch to arrive at pitch rate commands along line 42. Pitch rate commands are combined in the pitch rate loop 44 along with the current pitch rate to arrive at elevator position commands along line 46 which are then combined in the command fusion and arbitration loop 48 to arrive at elevator commands. Other control loops may produce rudder commands which are arbitrated in the command fusion and arbitration unit 50 to arrive at rudder commands which, in the preferred embodiment, are combined with elevator commands in the fin interface unit 52 which outputs the selected elevator and rudder commands to a fin control computer that ultimately causes the fin actuators to move. The fin interface 52 is coupled to a fin control computer 54 through a serial interface 56.

Figure 8:
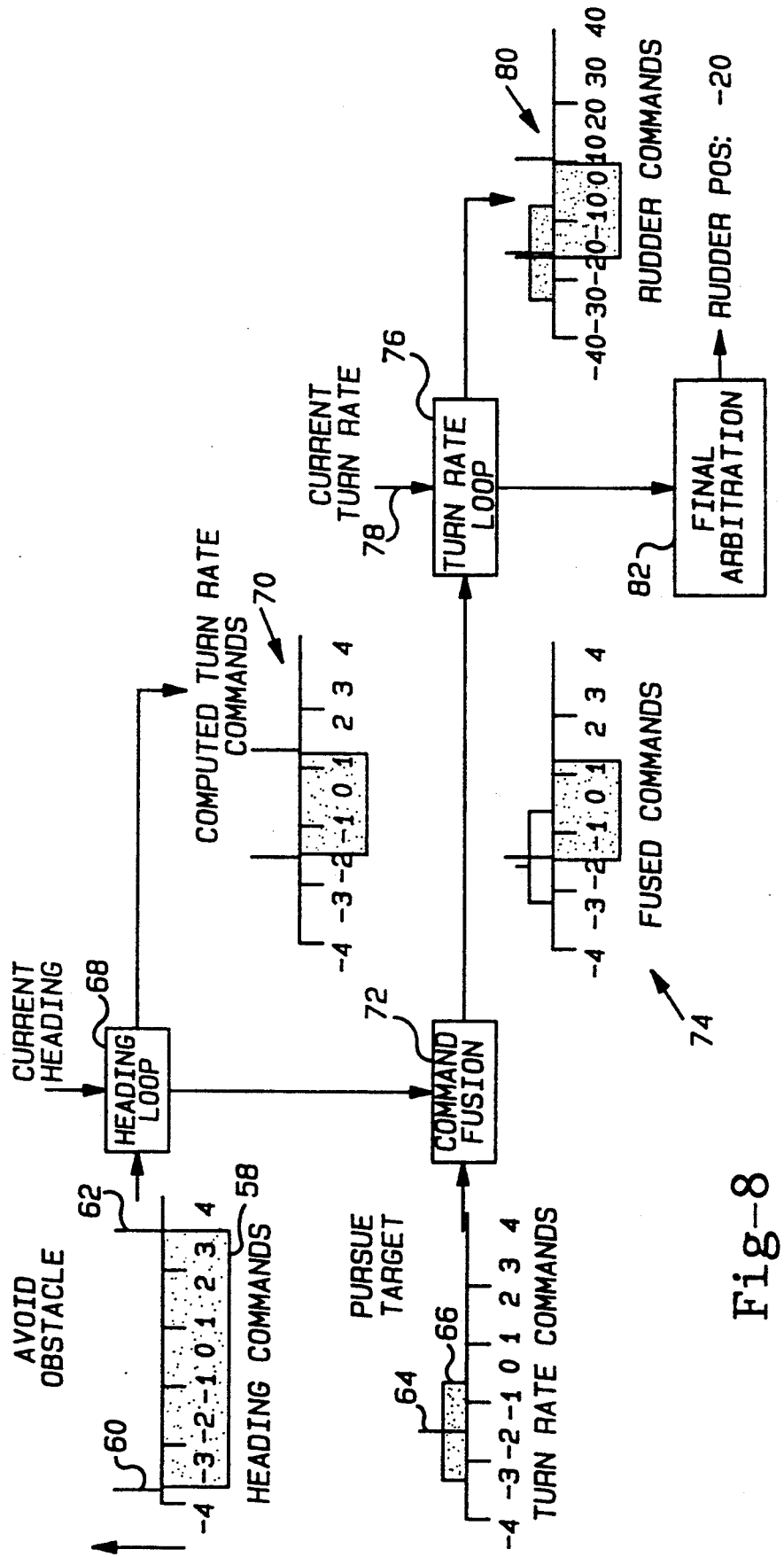
FIG. 8 is an example of command fusion of different behaviors.

Referring now to FIG. 8, an example of command fusion as performed in the arbitration units 48 and 50 is shown. As discussed above, the command representation allows commands from different behaviors to be fused at different levels of the control system. It may happen that an avoid-obstacle behavior can best express its commands in terms of headings, while a pursue-target behavior is best suited to express commands in terms of turn rates. The heading commands may easily be processed by the existing control laws to obtain corresponding turn rate commands. These may then be fused with commands from the pursue target behavior. In more detail, the avoid-obstacle behavior issues a zone 58 with a negative preference indicating that any heading straight ahead is unacceptable. It also issues spike commands 60 and 62 to either side indicating headings that are desirable for obstacle avoidance. (Zones could also have been used here instead of spikes.) The pursue-target behavior has determined an optimal turn rate for tracking the target and accordingly issues a positive spike 64 for that turn rate. It also issues a zone command 66 surrounding that value indicating a region of acceptable deviation that will not cause loss of the target.

The design of behaviors to produce zones, spikes, and clamps as command output is similar to the design of fuzzy control rules to produce fuzzy output commands. Unlike fuzzy control rules, however, a behavior may be designed to produce any combination of zones, spikes, and clamps such that the combination of these will yield any desired piece-wise constant preference profile.

The heading commands issued by the avoid obstacle behavior are passed through the heading loop 68 and transformed into turn-rate commands 70, at which point they can be fused with the turn rate commands from the pursue target behavior in the command fusion unit 72. These fused commands 74 are then passed through the turn-rate loop 76 and are combined with the current turn rate 78 and the results are transformed into rudder commands 80. Finally, the rudder command with the strongest preference is selected during final arbitration 82 and sent to a rudder actuator to determine a rudder position. It should be noted that the command fusion steps performed in FIG. 8 are illustrative of those performed by the command fusion and arbitration units 48 and 50 in FIG. 7.

The command fusion state 72 merely represents the merging of commands from different behaviors. If command profile edge data from different behaviors are kept in separate arrays, then these data are copied into a single array. The final arbitration state 82 is where command profile edges are sorted and analyzed to yield a final output command and feedback of behavior participation.

Figure 9:
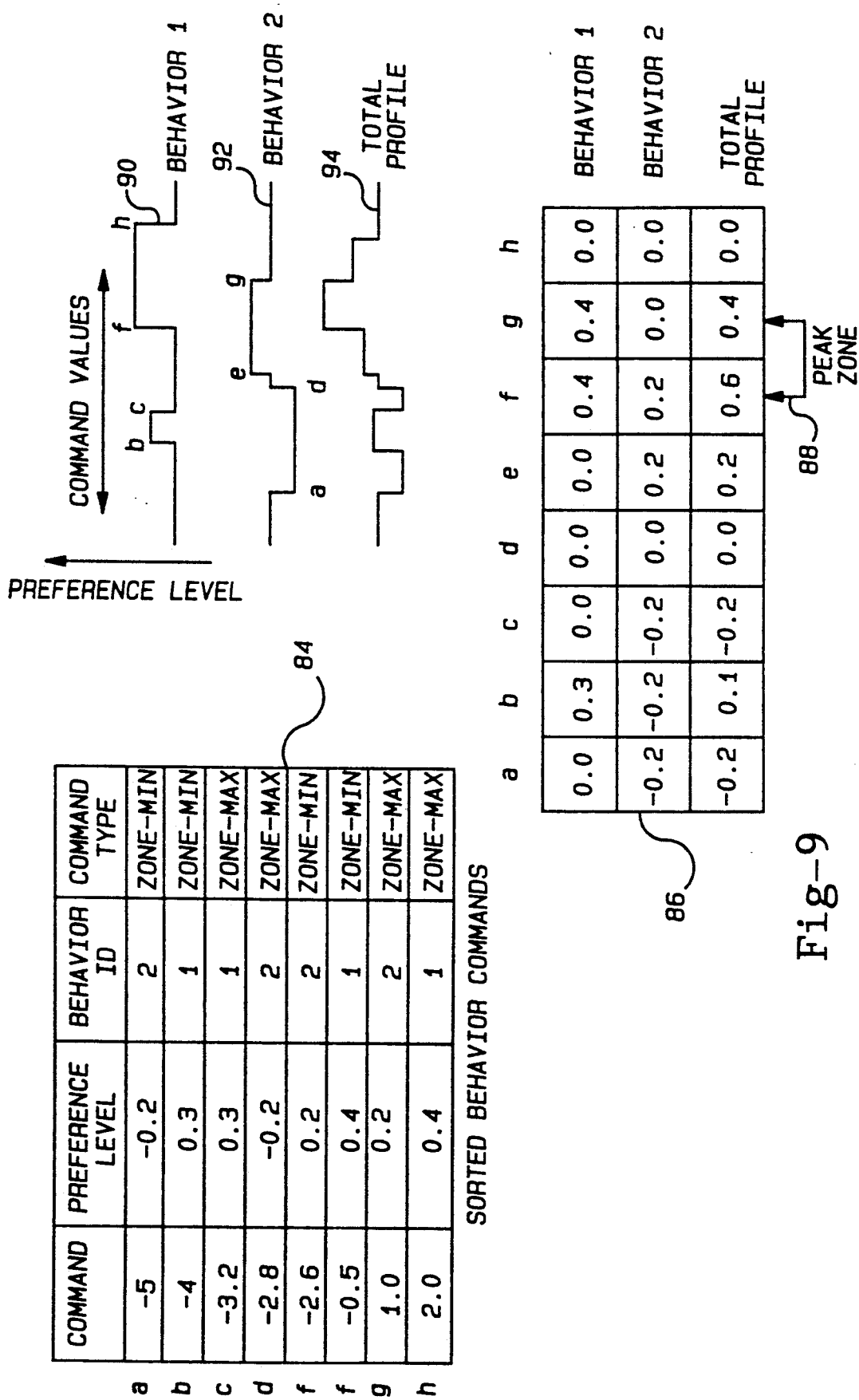
FIG. 9 is a diagram of command arbitration in accordance with the present invention.

As command preferences from different behaviors are combined, arbitration must eventually take place to determine the command that will ultimately be sent to the actuators. Arbitration begins by combining zones and spikes to get a preference level profile, and then finding the peak of this profile as shown in FIG. 9. Commands from multiple behaviors are combined as follows. First, commands from all contributing behaviors are entered into a table and are sorted according to command values in a sorted behavior commands table 84. Command values shown in 84 are examples of values that might be produced by behaviors in response to sensor input. Preference levels, behavior ID, and command type are retained with each command during the sort. The zone-min and the zone-max labels are used to keep track of the leading and trailing edges of each zone. Recognizing that each zone edge corresponds to a change in the total profile, an array 86, equal in size to the total number of zone edges can be filled from left to right accumulating the preference level along the way. A linear search of this array 86 will now yield the peak preference level 88 of the fused commands. The index that identifies the peak zone 88 also gives the corresponding command value. During arbitration, if the maximum is on a spike, then we choose that value, otherwise, the maximum is in a zone and we choose the value within the zone that requires the minimal amount of change. In this way, movement of a zone will not cause unnecessary changes in commands.

If the maximum value is found to fall within a clamped region, that is, outside an area that is allowed by a clamp, then a function of the command's preference level is compared to the preference level of the clamp; if the clamp preference is higher, then the command is modified so that it falls within the region deemed acceptable by the clamp. In cases where clamps overlap, then the clamp with the highest preference level is used. Because clamps are applied after a preferred command is found using zones and spikes, they provide a means of defining higher priority constraints.

As a further illustration of this process, the table 84 represents a sorting of the behavior commands which can be viewed as piece-wise constant preference profiles 90 and 92. Proceeding from left to right, that is, from low command values to high command values, each zone minimum or maximum is labelled with letters a–h. The command value, preference level, behavior ID and command type for each point a–h are listed in table 84. The total preference profile is computed as follows. For each row in Table 84, an entry is made in a corresponding column at array 86. The first entry in column A of array 86 is determined from row A of Table 84. Initially, the entries in array 86 are all zero. A cell of array 86 is then filled in correspondence with the behavior of the entry in Table 84.

For entry A, a value of −0.2 is added to the row of array 86 that corresponds to behavior 2 because the behavior-id from table 84 is 2. The values in the first two rows of array 86 are then added to get the value for the total profile in the last row. The values for each successive column of array 86 are then computed by copying the values from the previous column and then modifying the cell that corresponds with the next entry of table 84. For entry B, the value 0.3 is added in the first row. For entry C, the value 0.3 is subtracted from the first row. This is because zone-max commands are subtracted while zone-min commands are added.

The preference profiles 90 and 92 illustrate the profiles represented by the first two rows of array 86. The total profile 94 illustrates the result obtained in the final row of array 86. The peak zone 88 is found by searching for the maximum value in the last row of array 86. As indicated, the peak zone lies between entries F and G. Using table 84, we may determine that the resulting output command must be between the values −0.5 and 1.0 in this example. The command that is ultimately selected will have a value that lies within this constraint and that also is closest to the value obtained from the previous iteration of the arbiter.

The piece-wise constant representation and corresponding arbitration procedure described above is distinguished from any discrete representation approach such as in FIGS. 1 or 2 by the fact that commands are not limited to a fixed set of pre-assigned values.

It is desirable to obtain a measure of the relative contribution that each behavior makes to the selected command value. This can be a helpful tool for analysis during system development as well as for implementation of various learning schemes. Toward this end, it is important that a measure of participation be computed as part of command arbitration. A participation measure is computed for each behavior to help identify which behaviors contributed most to the current actions. A technique for determining participation is as follows:

For each behavior:
If: selected command is a spike; and the spike belongs to current behavior;
Then: set behavior participation to 1.0.
Otherwise
let x=minimum preference level for current behavior;
y=total preference level for selected command;
z=preference level for behavior at command value;
set behavior participation to $(z-x/y-x)$.

This algorithm gives credit for participation to behaviors that vote in favor of the selected command as well as behaviors that vote against anything other than the selected command. If a behavior has issued a spike at the selected command, that behavior is assigned 100% participation. For each other behavior, the behavior's own preference for the selected command is compared with the total preference for the selected command after adjusting both by the minimum preference level of the behavior.

To guarantee stability of real-time control loops, it is essential that command fusion and arbitration may be performed in bounded time. Close examination of the arbitration steps shows that arbitration is mainly bounded by a sort operation. The order of command arbitration complexity is as follows:

sort commands by command value—$O(n \log(n))$;
compute preference level profiles—$O(n)$;
find maximum preference level—$O(n)$;
clamp preferred command—$O(n)$; and
update behavior participation—$O(kn)$;

where n equals number of command edges (2 for zones, 1 for spikes and 1 for clamps), and k equals number of behaviors. Since sorting takes Order (n log(n)) time, the remaining operations are all less time consuming. Thus, we can be certain that, for a given number of behavior commands, the control loop and arbitration will operate within a fixed time-bound period.

Another important aspect of system stability, relates to the effects of switching between different behaviors at high rates during the arbitration period. This can easily occur in equilibrium states when two opposing behaviors have nearly equal preference levels. As illustrated in FIG. 10, a very small change in preference of behavior B2 will cause the output to switch between −0.3 and +0.5. Typically, this will cause the actuator to oscillate at a high rate. Although the vehicle as a whole will still respond appropriately with the average of these commands, the oscillations are detrimental to the actuators. This process is analogous to a bang-bang control system switching repeatedly from one state to another, as shown in FIG. 11. When a standard bang-bang control system is operating near its switching threshold, the addition of a small amount of noise will cause the system to switch at a high frequency. Previous techniques for smoothing output of bang-bang systems can be adapted to the present invention.

FIG. 12 illustrates a classical method for smoothing the input of a bang-bang control system by adding noise to the input and then filtering the output. Since the duty cycle of the unfiltered output 96 after the addition of noise is proportional to the input signal, the filtered output level 98 is also proportional to the input.

FIG. 13 shows how this technique may be applied to the command arbitration procedure of the present invention. First, a small amount of noise is added to the dominant behavior's activation (in this case B1). The high frequency oscillations 100 may then be filtered without hindering the response time of the actuators.

Figure 14:
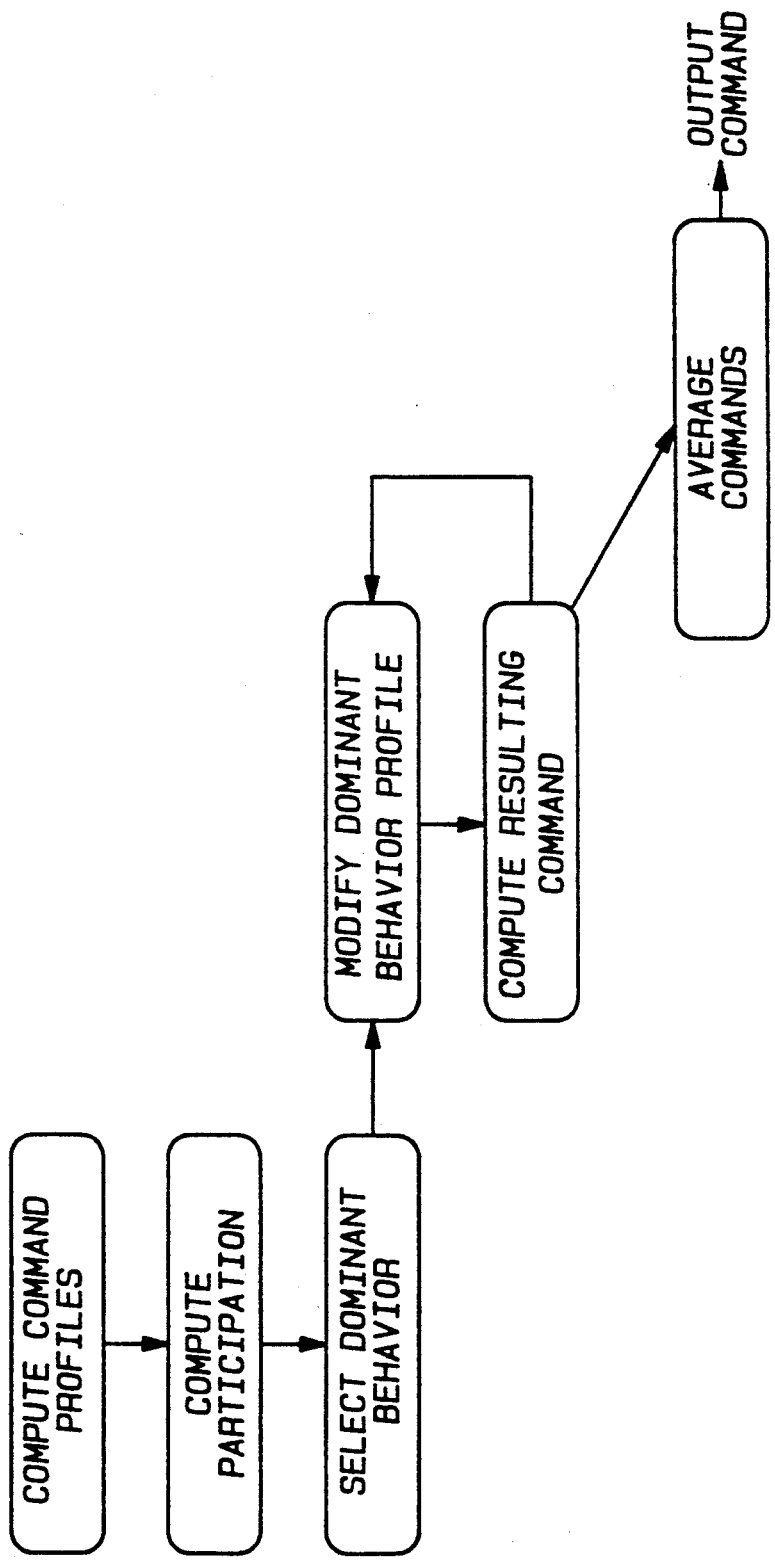
FIG. 14 is a flow chart of the steps of the arbitration procedure with smoothing.

FIG. 14 illustrates a procedure that has an effect equivalent to adding noise. In this procedure, participation is used to find the dominant behavior. Once the dominant behavior is found, output samples are obtained for small changes in the behavior's activation. That is, the effect of activation of the dominant behavior is modified by small increments and corresponding output samples are obtained. The samples are then averaged to give the smooth output command.

Figure 15:
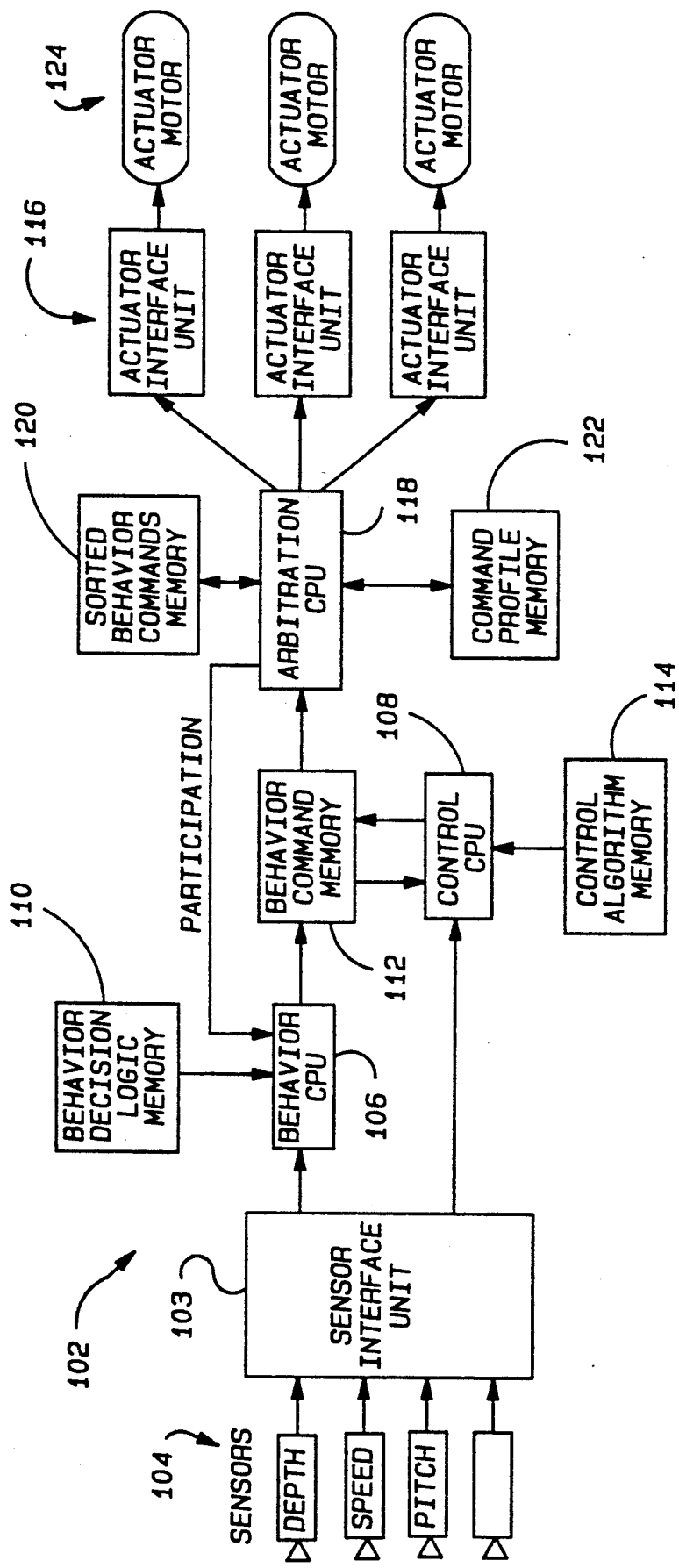
FIG. 15 is a diagram of a system architecture of the present invention in accordance with a preferred embodiment of the present invention.

To obtain a realization of this invention for real-time control applications, a system architecture 102 such as that shown in FIG. 15 may be used. In this figure, distinct computing units or CPU's and distinct memory units have been identified according to their associated function. While the system may be implemented exactly in this manner, in practice, a single CPU can often be used to perform the functions of two or more of the CPU's, and two or more of the memory units may be combined into a single memory unit.

As shown in FIG. 15, real-time data enters the system through a sensor interface unit 103. Such units are commonly used in the present art. The sensor interface unit 103 samples data from sensors 104, and makes this data available in registers that may be polled by both a Behavior CPU 106 and Control CPU 108. The Behavior CPU 106 repeatedly cycles through the instructions in its Behavior Decision Logic Memory 110. These instructions cause data to be read from the sensor interface unit 103 and they cause new command data corresponding to zones, spikes, and clamps to be entered into the Behavior Command Memory 112 on every cycle. The exact command values and preference levels written into the Behavior Command Memory 112 at any particular moment are dependent on the sensor data values available at that moment, and the instructions in the Behavior Decision Logic Memory 110. The Behavior Decision Logic will vary depending on the particular application of this control system.

As new command data is entered into the Behavior Command Memory 112, the Control CPU 108 may read this data, process it, and enter the results back into a different location within the Behavior Command Memory 112. The role of the Control CPU 108 is to transform control commands issued by the behaviors into control commands that are suitable to control actuators. These transformations are determined by the algorithms contained within the Control Algorithm Memory 114. A wide range of algorithms exist within the present art. Typically, these algorithms will use inverse models of the plant dynamics to obtain derivatives of the original control command. For example, a depth command may be transformed into a pitch command, then into a pitch rate command, and finally, into a fin position command. Units 108 and 114 may not be required for all applications.

In many applications under the present art, when control algorithms are used, they are applied to a single valued reference input, and multiple sensor inputs, to produce a single valued control output. When used in this invention, the same control algorithms must be applied to each zone, spike, and clamp command produced by the behaviors, and they must produce a corresponding output of zones, spikes, and clamps. To do this, all behavior command attributes, such as preference level, behavior id, and command type, are copied into a new array. Then as each command value is copies to this new array, the command value is used as the reference input to the associated control algorithm and the resulting single valued output is inserted into the new array in place of the original command value. The Control CPU 108 repeatedly cycles through all behavior commands to provide frequently updated command preference profiles represented in terms of command variables that are suitable for use by multiple Actuator Interface Units 116.

Before these commands can be used by the Actuator Interface Units 116, the command preference profiles must be analyzed to obtain unique command values. This is the job of the Arbitration CPU 118. The Arbitration CPU 118 maintains a table of sorted behavior commands for each actuator that it must control. These tables reside within the Sorted Behavior Commands memory 120. Commands are copied from the Behavior Commands Memory 112 into the tables within the Sorted Behavior Commands Memory 120, and then sorted according to their command value. Profiles are then calculated using arrays residing in the Command Profile Memory 122. Procedures for selecting the peak zone, determining relative participation, and smoothing the command output are also performed within the Arbitration CPU 118. When a unique command value is obtained for a given actuator 124, this value is written to a register in the corresponding Actuator Interface Unit 116. The Actuator Interface Unit 116 then translates this digital value into motion of the actuator 124, either through conversion to an analog signal, or through application of repeated pulses to a stepper motor. A variety of other means for such conversion exist within the present art.

In the autonomous underwater vehicle application the present invention has been used to combine over 20 behaviors to provide a control system that operates vehicle fins and ballast tanks. The arbitration scheme has been used to balance the demands of these competing behaviors. For example, one behavior to avoid the bottom competes with another to stay low, and a third to avoid the surface. The present invention allows these behaviors to reach equilibrium conditions that result in the vehicle following the ocean bottom. The participation feedback from the arbitration procedure is used to adjust the relative strengths of these behaviors. Changing the relative strength of the behaviors alters the path of the vehicle. In one embodiment the disclosed invention has been implemented and tested in a software simulation of an underwater vehicle.

In summary, the present invention allows behaviors to be combined through command fusion rather than subsumption. The representation of commands permits interfaces to existing control loops an allows these interfaces to be placed at different levels of the control loops. The invention has a bounded arbitration time so that control loop stability will not be disrupted by the arbitration process. The invention also incorporates a method for smoothing behavior switching transients.

Those skilled in the art can appreciate that other advantages can be obtained from the use of this invention and that modification may be made without departing from the true spirit of the invention after studying the specification, drawings and following claims.

What is claimed is:

1. A system for producing a single command for a controlled system from a plurality of control sources, said system comprising:
    a plurality of control sources each responding to inputs to produce a command output represented as a piece-wise constant preference level profile covering a full continuous range of allowable command values;
    means for representing the piece-wise constant preference level profiles in terms of attributes in order to easily combine and sort the preference level profiles to obtain a total profile within a bounded time period;
    means for creating the total profile from the combination of individual preference level profiles of the plurality of control sources by adding the preference level profiles for each of the plurality of control sources;
    means for determining a peak zone in said total profile having the largest preference level; and
    means for producing a desired response in the controlled system to the command indicated by said peak zone.

2. The system of claim 1 further comprising means for determining the relative contribution that each of the plurality of control sources has made to the command indicated by said peak zone.

3. The system of claim 2 further comprising:
    means for determining the dominant control source from said relative contribution.

4. The system of claim 3 further comprising:

means for modifying the effective activation of said dominant control source by small increments to produce sample output commands; and means for averaging said sample commands to produce a smooth output signal, whereby oscillations between two disjoint output commands are reduced.

5. The system of claim 1 wherein said plurality of control sources includes a first control source producing a command of a first type; a second control source producing a command of a second type, said second type being derivative of said first type command; and wherein said system further comprises means for converting said commands of a first type into commands of said second type, whereby said system operates on commands of said second type to produce a single response to said first and second control sources.

6. The system of claim 1 wherein said preference level profiles are defined by said control sources by the upper and lower limits of zones, and by spikes corresponding to zones having single command values.

7. The system of claim 6 wherein said command values further comprise clamp regions corresponding to exclusionary commands defining zones which are not permitted, and said system further comprises means for clamping said peak zone wherein said clamp regions are excluded.

8. The system of claim 6 wherein said means for creating a total profile further comprises:

means for generating an array of preference levels at zone edges, said array being equal in size to the total number of zone edges in said preference level profiles of said control sources; and said array containing the preference levels of each of the plurality of control sources at each zone edge as well as the sum of said preference levels at each zone edge, wherein said total profile is created from said sum.

9. The system of claim 1 wherein said control sources control the movement of a vehicle and said input to said control sources include sensors responsive to said vehicle's location and movement.

10. A system for arbitrating multiple commands for a controlled system from a plurality of control sources, each responding to inputs to produce a command output, said system comprising:

means for generating a command output represented as a piece-wise constant preference level profile covering a full continuous range of allowable command values;

means for representing the piece-wise constant preference level profiles in terms of attributes in order to easily combine and sort the preference level profiles to obtain a total profile within a bounded time period;

means for creating the total profile from the combination of preference level profiles of the plurality of control sources by adding the preference level profiles for each of the plurality of control sources;

means for determining a peak zone in said total profile having the largest preference level; and means for producing a desired response in the controlled system to the command indicated by said peak zone.

11. The system of claim 10 wherein said plurality of control sources includes a first control source producing a command of a first type; a second control source producing a command of a second type, said second type being derivative of said first type command; and wherein said system further comprises means for converting said commands of a first type into commands of said second type, whereby said system operates on said commands to the second type to produce a single response to said first and second control sources.

12. The system of claim 10 wherein said preference level profiles are defined by said control sources by the upper and lower limits of zones, and by spikes corresponding to zones having single command values.

13. The system of claim 12 wherein said command values further comprise clamp regions corresponding to exclusionary commands defining zones which are not permitted, and said system further comprises means for clamping said peak zone wherein said clamp regions are excluded.

14. The system of claim 12 wherein said means for creating a total profile further comprises:

means for generating an array of preference levels at zone edges, said array being equal in size to the total number of zone edges in said preference level profiles of said control sources; and said array containing the preference levels of each of the plurality of control sources at each zone edge as well as the sum of said preference levels at each zone edge, wherein said total profile is created from said sum.

15. The system of claim 10 further comprising:

means for determining the level of participation of each of the plurality of control sources; and means for determining the dominant control source from said level of participation.

16. The system of claim 15 further comprising:

means for modifying the effective activation of said dominant control source by small increments to produce sample output commands; and means for averaging said sample commands to produce a smooth output signal, whereby oscillations between two disjoint output commands are reduced.

17. The system of claim 10 for arbitrating multiple commands for a controlled system from a plurality of control sources, each responding to inputs to produce a command output, further comprising a sensor interface unit for sampling data from a plurality of sensors, and wherein said means for generating a command output represented as a piece-wise constant preference level profile includes a behavior central processing unit (CPU) for reading data from said sensor interface unit and generating new command data represented as piece-wise constant profiles, and said means for representing the piece-wise constant preference level profiles includes behavior command memory for storing said piece-wise constant profile, and said means for creating the total profile includes an arbitration CPU for analyzing command preference profiles to obtain unique command values including means for generating a table of sorted behavior comands for actuators to be controlled and a command profile memory for storing said command preference profiles, said arbitration CPU further comprising said means for determining a peak zone in said total profile having the largest preference level; and said means for producing a desired response in the controlled system to the command indicated by said peak zone includes an actuator interface unit for receiving unique command values generated by said arbitration CPU representing said peak command zone, and for generating signals controlling said actuators.

18. A method for arbitrating multiple commands for a controlled system from multiple behaviors, said method comprising:
  providing a plurality of control sources, each responding to inputs to produce a command output represented as a piece-wise constant preference level profile, covering a full continuous range of allowable command values;
  representing the piece-wise constant preference level profiles in terms of attributes in order to combine and sort the preference level profiles to obtain a total profile within a bounded time period;
  creating the total profile from the combination of preference level profiles of the plurality of control sources by adding the preference level profiles for each of the plurality of control sources;
  determining a peak zone in said total profile having the largest preference level; and
  producing the desired response in the controlled system in response to the command indicated by said peak zone.

19. The method of claim 18 further comprising the steps of:
  generating a command of a first type from a control source of a first type;
  generating a command of a second type from a control source of a second type, said command of the second type being derivative of said first type command; and
  converting said commands of a first type into commands of said second type, whereby said system operates on said commands of the second type to produce a single response to said first and second control sources.

20. The method of claim 18 further comprising the step of defining said preference level profiles by the upper and lower limits of zones and also by spikes corresponding to zones having single command values.

21. The method of claim 20 further comprising the steps of:
  generating command values having clamp regions corresponding to exclusionary commands defining zones which are not permitted; and
  clamping said peak zone wherein said clamp regions are excluded.

22. The method of claim 20 wherein said step of creating a total profile further comprises the steps of generating an array of preference levels at zone edges, said array being equal in size to the total number of zone edges in said preference level profiles of said control sources, said array containing the preference level of each of the plurality of control sources at each zone edge as well as the sum of said preference levels at each zone edge, wherein said total profile is created from said sum.

23. The method of claim 18 further comprising the steps of determining the level of participation of each of the plurality of control sources; and
  determining the dominant control source from said level of participation.

24. The method of claim 23 further comprising the steps of:
  modifying the effect of activation of the dominant behavior by small increments to produce sample output commands; and
  averaging said sample commands to produce a smooth output signal, whereby oscillations between two disjoint output commands are reduced.

25. A system for arbitrating multiple commands from a plurality of control sources, each responding to inputs to produce a command output, said system comprising:
  sensor interface unit for sampling data from a plurality of sensors;
  behavior central processing unit (CPU) for reading data from said sensor interface unit and generating new command data represented as a piecewise constant profile;
  behavior command memory for storing said piece-wise constant profile;
  control CPU for transforming command issued by behaviors into control commands that are suitable to control actuators;
  arbitration CPU for analyzing command preference profiles to obtain unique command values including means for generating a table of sorted behavior commands for actuators to be controlled;
  command profile memory for storing said command preference profiles;
  said arbitration CPU further comprising means for selecting a peak zone in a total preference profile;
  actuator interface unit for receiving unique command values generated by said arbitration CPU representing said peak command zone, and for generating signals controlling said actuators.

26. A system for producing a single command for a controlled system from a plurality of control sources, said system comprising:
  a plurality of control sources each responding to inputs to produce a command output represented as a piece-wise constant preference level profile covering a full continuous range of allowable command values;
  means for representing the piece-wise constant preference level profiles in terms of attributes in order to combine and sort the preference level profiles to obtain a total profile within a bounded time period;
  means for creating the total profile from the combination of individual preference level profiles obtained from the plurality of control sources, and
  means for producing a desired response in the controlled system on the basis of the shape of the total profile.

27. The system of claim 26 wherein said preference level profiles are defined by said control sources by the upper and lower limits of zones, and by spikes corresponding to zones having single command values.

28. The system of claim 27 wherein said means for creating a total profile further comprises:
  means for generating an array of preference levels at zone edges, said array being equal in size to the total number of zone edges in said profiles of said control sources; and
  said array containing the preference levels of each said control source at each zone edge and the combination of said preference levels at each zone edge, wherein said total profile is created from said combination.

* * * * *